(12) United States Patent
Gaminde Larreta et al.

(10) Patent No.: US 12,338,799 B2
(45) Date of Patent: Jun. 24, 2025

(54) SYSTEM FOR REPOSITIONING TWO COMPONENTS OF A WIND TURBINE WITH RESPECT TO EACH OTHER

(71) Applicant: Siemens Gamesa Renewable Energy Innovation & Technology S.L., Sarriguren (ES)

(72) Inventors: Beinat Gaminde Larreta, Mundaka (ES); Juan Pablo Navarro Garriz, Burlada (ES); Diego Alba Angulo, Navarra (ES); Daniel Artal Lorente, Pamplona (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 0 days.

(21) Appl. No.: 18/569,777

(22) PCT Filed: Jun. 22, 2022

(86) PCT No.: PCT/EP2022/066944
§ 371 (c)(1),
(2) Date: Dec. 13, 2023

(87) PCT Pub. No.: WO2022/268848
PCT Pub. Date: Dec. 29, 2022

(65) Prior Publication Data
US 2024/0271603 A1    Aug. 15, 2024

(30) Foreign Application Priority Data
Jun. 22, 2021    (EP) .................................... 21382551

(51) Int. Cl.
*F03D 80/50*    (2016.01)

(52) U.S. Cl.
CPC ........ *F03D 80/50* (2016.05); *F05B 2230/604* (2013.01); *F05B 2260/301* (2013.01)

(58) Field of Classification Search
CPC .... F03D 80/50; F03D 80/00; F05B 2230/604; F05B 2260/301
See application file for complete search history.

(56) References Cited

U.S. PATENT DOCUMENTS

2011/0187122 A1    8/2011    Martinez et al.

FOREIGN PATENT DOCUMENTS

| EP | 2794192 B1 | 3/2016 |
|---|---|---|
| WO | 2019001662 A1 | 1/2019 |

OTHER PUBLICATIONS

PCT International Search Report and Written Opinion of International Searching Authority mailed Aug. 23, 2022 corresponding to PCT International Application No. PCT/EP2022/066944 filed Jun. 22, 2022.

*Primary Examiner* — Moshe Wilensky
(74) *Attorney, Agent, or Firm* — Schmeiser, Olsen & Watts LLP (57) ABSTRACT

A system for repositioning two components of a wind turbine with respect to each other, the two components being connected to each other by means of a bolted joint and the system includes at least one alignment tool kit. Further provided is a bolted joint of two components of a wind turbine.

15 Claims, 11 Drawing Sheets

SYSTEM FOR REPOSITIONING TWO COMPONENTS OF A WIND TURBINE WITH RESPECT TO EACH OTHER

CROSS-REFERENCE TO RELATED APPLICATIONS

This application claims priority to PCT Application No. PCT/EP2022/066944, having a filing date of Jun. 22, 2022, which claims priority to EP Application No. 21382551.6, having a filing date of Jun. 22, 2021, the entire contents both of which are hereby incorporated by reference.

FIELD OF TECHNOLOGY

The following relates to a system for repositioning two components of a wind turbine with respect to each other, the two components being connected to each other by means of a bolted joint. Embodiments of the invention further relate to a bolted joint of the two components of the wind turbine having the system installed therein and a wind turbine comprising the bolted joint.

BACKGROUND

In wind turbines, components of the wind turbine connected with one another by means of bolted joints can be mispositioned. This can have several reasons such as poor installation, overload during use, bolt preload reduction and so on.

In order to recover the originally designed position of the components, in particular provide correct alignment between the two components, it is necessary to at least perform an action of alignment. In the state of the art, this is done by using an external crane to lift and move at least one of the components. The usage of the external crane is very cost-intensive and cumbersome.

In case that the misalignment has caused a wearing and loss of original properties between the surfaces of the components of the wind turbine in contact, it may also be necessary to perform some operations to clean and reassure the original design situation between the components. This operation is being assisted in the state of the art using the external crane.

SUMMARY

An aspect relates to provide a more convenient and cost-efficient method to reposition the components of the wind turbine with respect to each other.

According to a first aspect of embodiments of the invention, the above aspect is solved by a system for repositioning two components of a wind turbine with respect to each other, the two components being connected to each other by means of a bolted joint. The system comprises at least one alignment tool kit and/or at least one compression tool kit.

The at least one alignment tool kit comprises:
a block comprising at least two through holes;
an alignment bolt configured for passing through a first through hole of the at least two through holes in the block and through two aligned first bores of the two components;
at least one fastening bolt configured for passing through a second through hole of the at least two through holes in the block and a second bore of one of the two components, the second bore being adjacent to one of the first bores;
at least one expandable bush configured for surrounding the at least one fastening bolt and configured to be inserted together with the at least one fastening bolt into the second bore; and
at least one nut configured for at least partial insertion into the expandable bush and having an inner threading corresponding to an outer threading of the at least one fastening bolt such that the at least one fastening bolt may be fastened to the at least one nut inside of the expandable bush and the second bore.

The at least one compression tool kit comprises a compression stud configured for passing through two aligned fourth bores of the two components, in particular when the components are aligned with one another by means of the at least one alignment tool kit, which, however, may also be possible by other means than the alignment tool kit. The compression stud has a threaded end-section corresponding to an inner threading of one of the two fourth bores. Also, the at least one compression tool kit comprises a compression actuator configured for being attached to the compression stud and creating a compression load between the two components when being actuated. The at least one compression tool kit further comprises:
a block comprising at least two through holes, wherein the compression stud is configured for passing through a first through hole of the at least two through holes in the block;
at least one fastening bolt configured for passing through a second one of the at least two through holes in the block and a fifth bore of one of the two components, the fifth bore being adjacent to one of the fourth bores;
at least one expandable bush configured for surrounding the at least one fastening bolt and to be inserted together with the at least one fastening bolt into the fifth bore; and
at least one nut configured for insertion into the expandable bush and having an inner threading corresponding to an outer threading of the at least one fastening bolt such that the at least one fastening bolt may be fastened to the at least one nut inside of the expandable bush and the fifth bore.

Accordingly, the at least one compression tool kit besides the compression stud and compression actuator has a similar or equivalent configuration, in particular with respect to the block, expandable bush and nut, as the alignment tool kit.

Accordingly, the system according to the first aspect of embodiments of the invention, by means of the at least one alignment tool kit and/or the at least one compression tool kit, which may in particular be multiple alignment tool kits and compression tool kits of the system, provides for a convenient and cost-efficient method for aligning and thereby for repositioning the components of the wind turbine with respect to each other.

The alignment tool kit with the alignment bolt and at least one fastening bolt may be simply installed inside of bores of the two components, which are respectively aligned with each other. Accordingly, previously installed component bolts of the bolted joint that had secured the components to one another will be uninstalled prior to installing the at least one alignment tool kit in the bolted joint or, in other words, between the two (bolted) components.

In the at least one alignment tool kit, the alignment bolt serves the purpose of aligning the two components with respect to each other by passing through the two aligned first bores. The at least one fastening bolt together with the at least one expandable bush and the at least one nut inside of the second bore is mechanically connected to the alignment bolt by means of the block and thereby serves the purpose of supporting the alignment bolt in withstanding the loads acting on the alignment bolt in the course of the alignment operation performed by virtue of insertion of the alignment bolt into the two aligned first bores. The at least one expandable bush may for this purpose be configured expandable in the radial direction thereof. When the fastening bolt is fastened to the nut inside of the expandable bush, the expandable bush may expand inside of the second bore and thereby firmly press against the inside or inner wall or threading of the second bore, resulting in a firm attachment.

In the at least one compression tool kit, when the compression actuator is actuated, the compression tool kit creates a compression load from one of the components to the other one. The compression tool kits may be provided in other bores of the components than the alignment tool kits and the guiding studs and after the latter ones have been provided in the bolted joint. By means of the compression tool kit, it is possible to push one of the components away from the other one or, in other words, separate the components from one another. Thereby, it is possible to achieve the original design position and through the provided separation to perform cleaning and other steps for reassuring the original design position between the components after wearing and loss of original properties has occurred between the components.

The threaded end-section having an outer threading on the compression stud allows for the compression stud to be fastened inside of one of the fourth bores. It may be provided that the compression stud has means for attaching, in particular bolting, the compression actuator thereto. The compression actuator transmits the compression load to the compression stud and one of the two components by means of applying torque to it.

The at least one compression tool kit may comprise at least two fastening bolts, each one being configured for passing through one of two second through holes of at least three through holes in the block and one of two fourth bores of one of the two components, the fourth bores being disposed between the two second bores, wherein the at least one compression tool kit further comprises expandable bushes and nuts for each one of the at least two fastening bolts. Thereby, two adjacent fastening bolts of the compression tool kit may support the compression stud towards both sides in withstanding the loads acting on the compression stud, such that a better stability of the compression tool kit may be achieved.

The at least one alignment tool kit may comprise at least two fastening bolts, each one being configured for passing through one of two second through holes of at least three through holes in the block and one of two second bores of one of the two components, the first bores being disposed between the two second bores, and wherein the at least one alignment tool kit further comprises expandable bushes and nuts for each one of the at least two fastening bolts. Thereby, two adjacent fastening bolts of the alignment tool kit may support the alignment bolt towards both sides in withstanding the loads acting on the alignment bolt, such that a better stability of the alignment tool kit may be achieved.

The alignment bolt may comprise an unthreaded section having an outer diameter being substantially equal to an inner diameter of the two first bores. Thereby, the alignment bolt may be substantially press-fitted into the two first bores of the two components such that it achieves the desired alignment of the two components with respect to each other. A substantially equal diameter includes equal diameters and technical deviations, in particular caused by given manufacturing precision, therefrom. Accordingly, two diameters, one of which may be an outer diameter and the other one of which may be an inner diameter, may be understood as being substantially equal to one another when a deviation in diameter between the two is in the range from 0 to 2 mm, in particular in the range from 0 to 1 mm, and more particularly in the range from 0 to 0.5 mm.

The at least one alignment tool kit and the alignment bolt may comprise respectively corresponding means for fastening the alignment bolt to the block. For example, the respectively corresponding means may be an (outer) threaded section of the alignment bolt, which may not be inserted into any one of the first bores, and a corresponding (inner) threaded section of the first through hole of the block. In this case, the respectively corresponding means are provided by the alignment bolt and the block. Thereby, it is possible to fasten the alignment bolt directly to the block. Alternatively, it is possible that the at least one alignment tool kit further comprises a block-internal nut for partial insertion into the first through hole through which the alignment bolt is configured to pass. The block-internal nut may have an inner threaded section or inner threading (instead of the through hole in the block) corresponding to an outer threading of the alignment bolt such that the alignment bolt may be fastened to the block by fastening the alignment bolt to the block-internal nut.

The at least one expandable bush may comprise at least one slit. In particular, the at least one expandable bush may comprise multiple slits disposed at a distance from one another and around a circumference of the expandable bush. The one or more slits may extend in a lengthwise direction of the expandable bush. Also, the one or more slits may extend, in particular from a middle portion of the expandable bush, to a free end of the expandable bush. The one or more slits are a particularly simple yet effective way of providing the bush to be expandable in the radial direction of the expandable bush.

The at least one nut may comprise a conical section. The conical section is a simple way of providing the nut with the capability of being easily introduced into the expandable bush and further expanding the bush when the fastening bolt is fastened inside of the nut such that the expandable bush slides over the circumferentially increasing conical section when the fastening bolt is fastened or tightened further. The nut may also comprise a cylindrical section adjacent to the conical section.

The system may further comprise at least one guiding stud configured for passing through two aligned third bores of the two components. The two aligned third bores may be adjacent to the second bores, for example. In any case, the at least one guiding stud may be introduced into other bores of the components than the at least one alignment tool kit. The guiding stud may be inserted inside of the bolted joint or, in other words, between the two components, after the alignment by means of the at least one alignment tool kit has been performed. The guiding stud can assure that the alignment provided by means of the at least one alignment tool kit will remain during possible separation movements of the two components that may be achieved by further parts of the system as will be explained later, namely a compression tool kit and/or a pulling tool kit. The guiding stud can withstand the shear loads acting on the bolted joint. It may be necessary to provide several guiding studs depending in number on the maximum shear load acting on the bolted joint.

The at least one guiding stud may comprise an unthreaded section having an outer diameter being substantially equal to an inner diameter of the two third bores. Through the unthreaded section, it is possible that the guiding stud can be loaded with the shear loads acting on the bolted joint. The unthreaded section may have a substantially smooth surface, for example.

The at least one guiding stud may comprise a threaded end-section corresponding to an inner threading of the two aligned third bores. The threaded end-section having an outer threading on the guiding stud allows for the guiding stud to be fastened inside of one of the third bores, in particular the second one of the third bores counted in the direction along which the guiding stud is introduced into the third bores, for fastening the guiding stud therein.

Further, the at least one guiding stud may comprise a further threaded end-section, which may be located opposite of the other threaded end-section, configured to be fastened to an extraction element for extracting the at least one guiding stud from the two third bores later on.

The system may further comprise at least one pulling tool kit. The at least one pulling tool kit may comprise a pulling stud having an outer threaded end-section corresponding to inner threads of two aligned sixth bores of the two components and the at least one pulling stud having an unthreaded section having an outer diameter being substantially equal to an inner diameter of the two aligned sixth bores. The pulling stud thereby is able to create a traction load from one of the components to the other one of the components. Accordingly, it is possible by means of the pulling tool kit to separate the components from one another by means of pulling them away from one another. Thereby, it is possible to achieve the original design position and, through the provided separation, perform cleaning and other steps for reassuring the original design position between the components after wearing and loss of original properties has occurred between the components.

The at least one pulling tool kit may further comprise a pulling actuator configured for being attached to the at least one pulling stud and pulling the two components towards one another when being actuated. The pulling actuator may be a nut having an inner threading corresponding to an outer threading of the pulling stud. This outer threading may be located opposite of the outer threaded end-section corresponding to the sixth bores.

According to a second aspect of embodiments of the invention, the above aspect is solved by a bolted joint of two components of a wind turbine, a system according to the first aspect of embodiments of the invention being installed in the bolted joint.

The two components may be any of a hub, a rotor, a blade section, a tower section, a shaft, or a nacelle section of the wind turbine, for example. In particular, each of the two components may have a substantially circular or oval section. Through the substantially circular or oval section, the bolts that form the bolted joint may be distributed and connect the two components with each other through bores provided therein.

According to a third aspect of embodiments of the invention, the above aspect is solved by a wind turbine comprising the bolt according to the second aspect of embodiments of the invention.

BRIEF DESCRIPTION

Some of the embodiments will be described in detail, with reference to the following figures, wherein like designations denote like members, wherein.

DETAILED DESCRIPTION

Figure 1:
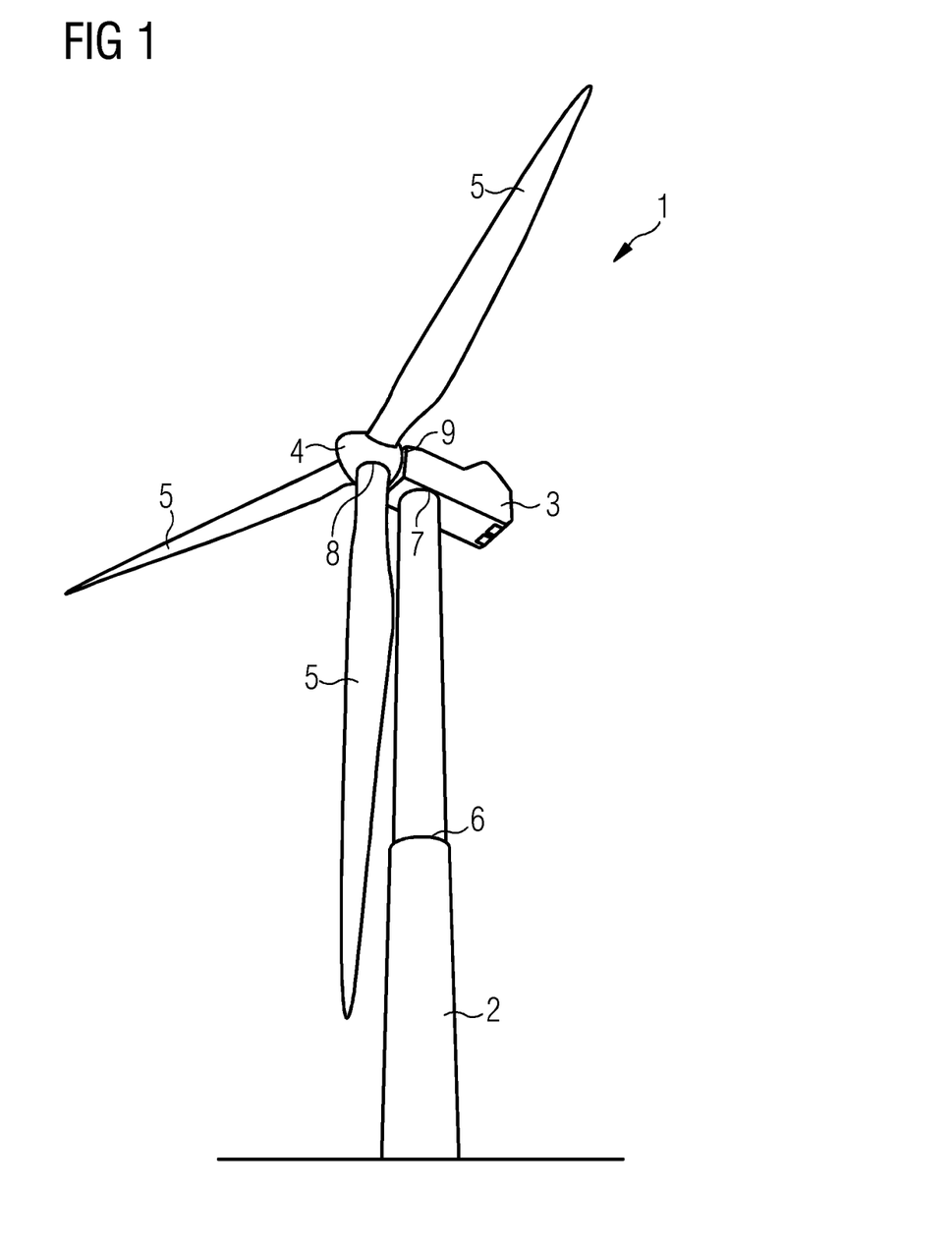
FIG. 1 shows a perspective view on a wind turbine.

FIG. 1 shows a wind turbine 1 having a tower 2 and a nacelle 3 connected thereto.

Figure 2:
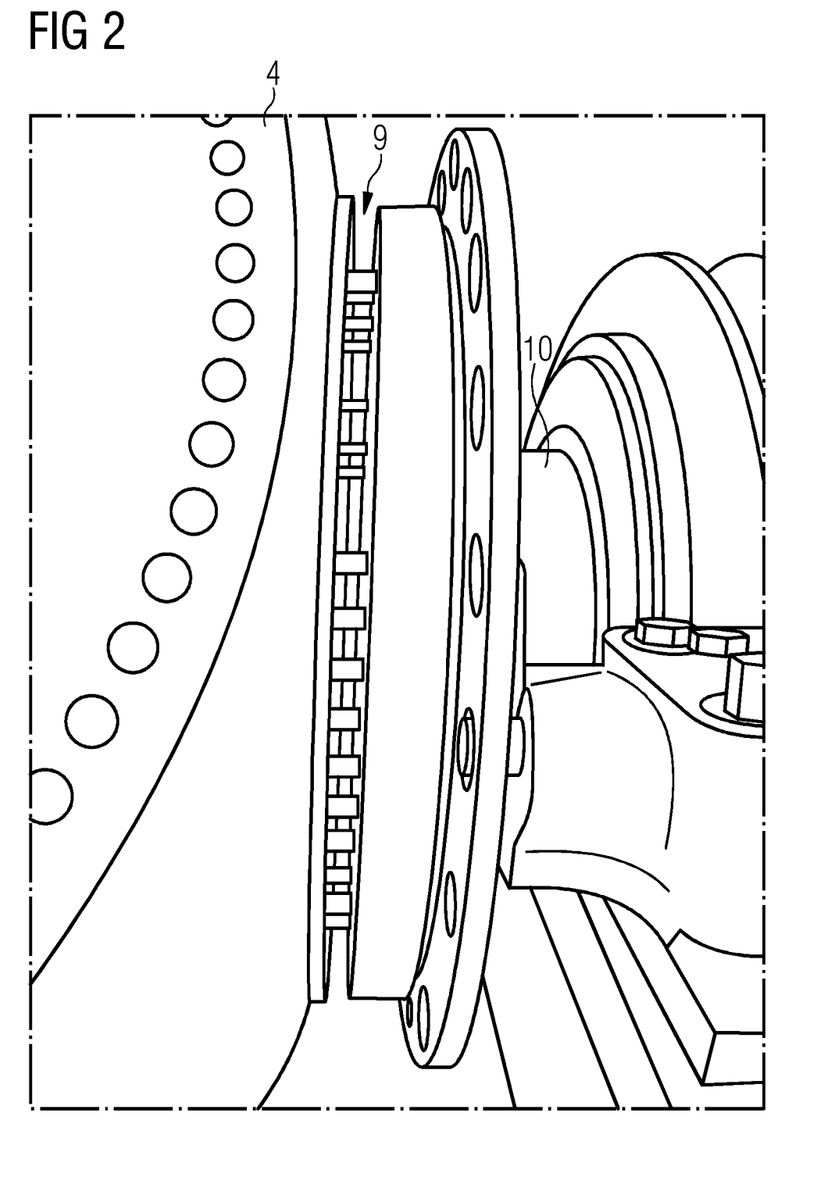
FIG. 2 shows a perspective view on a bolted joint connecting two components of the wind turbine with each other.

FIG. 2 shows how a main shaft 10 inside of the nacelle 3 is coupled by means of a bolted joint 9 to the rotor or hub 4 of the blades 5 attached thereto. A further bolted joint 6 is located in the tower 2 as this specific tower 2 comprises two tower sections connected to each other by means of the bolted joint 6. A further bolted joint 7 is provided between the connection of the nacelle 3 and the tower 2. Further bolted joints 8 of the wind turbine 1 are provided between the blades 5 and the rotor 4.

Each one of the bolted joints 6, 7, 8, 9 with time may experience mispositioning of the components or sections connected to each other, which in the case of bolted joint 9 as example are the rotor 4 and the main shaft 10. This can have different reasons such as poor installation, overload during use, bolt preload reduction and so on.

Providing proper repositioning of the connected components 2, 3, 4, 5, 10 with respect to each other and, in case that the misalignment has caused a wearing and loss of original properties between the surfaces of the connected components 2, 3, 4, 5, 10 of the wind turbine 1 in contact, perform operations to clean and reassure the original design situation between the components 2, 3, 4, 5, 10 respectively connected with each other, may be very cumbersome and cost-intensive.

Figure 3:
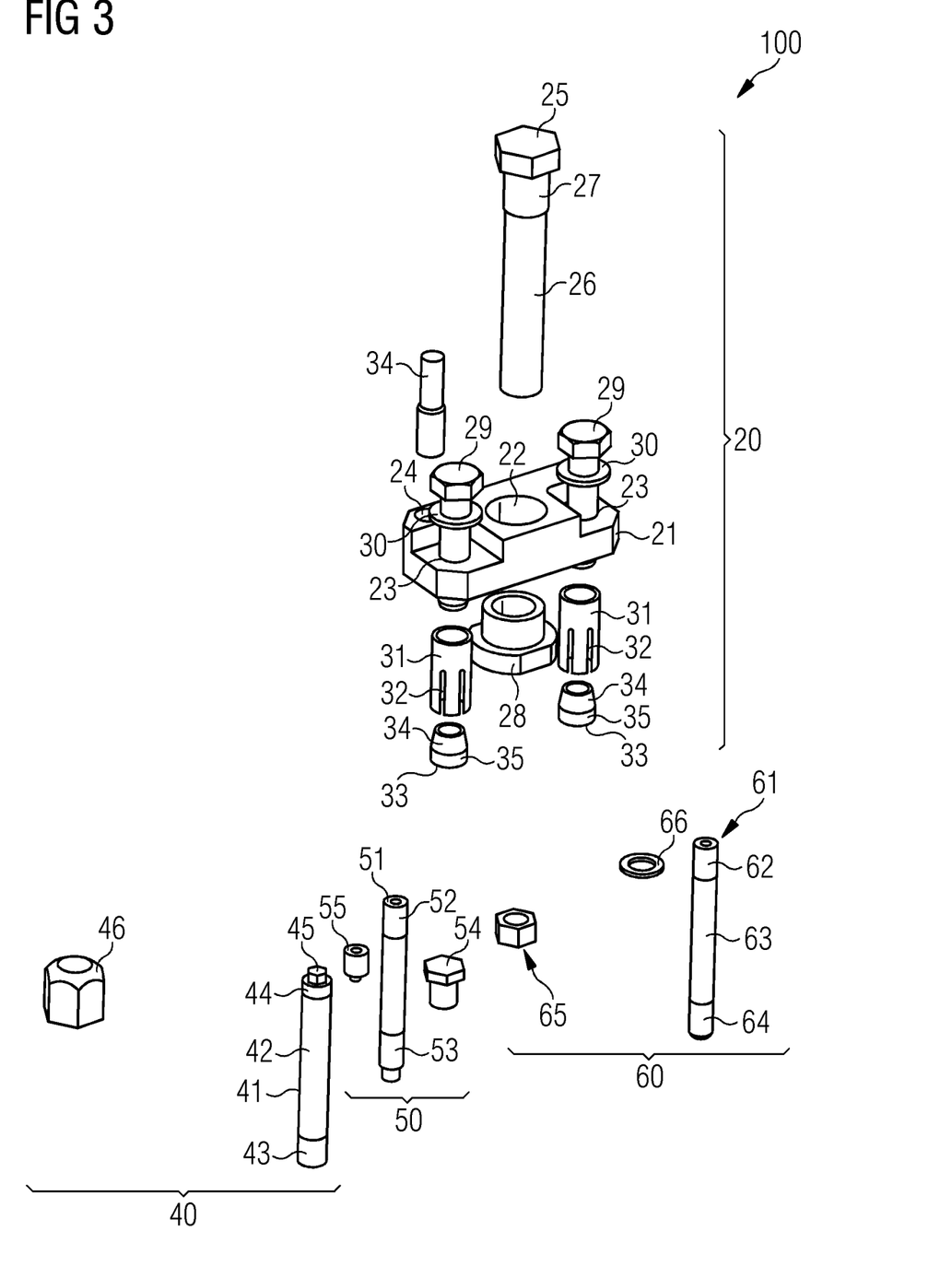
FIG. 3 shows a perspective view on a system for the bolted joint.

FIG. 3 shows a system 100 for repositioning two of the components 2, 3, 4, 5, 10 respectively connected to one another. For this purpose, the system 100, or more precisely parts of the system 100, may be installed inside of any one of the bolted joints 6, 7, 8, 9 of the wind turbine 1.

The system 100 has a modular design or, in other words, the system 100 is a modular system 100. The system 100 has different kits 20, 40, 50, 60 as modules, namely an alignment tool kit 20, a guiding tool kit 40, a compression tool kit 50 and a pulling tool kit 60, each of which has different parts forming the respective kit 20, 40, 50, 60. One of each kit 20, 40, 50, 60 is shown for system 100.

The system 100 may comprise several of the same kits 20, 40, 50, 60 for achieving the intended repositioning of the two components 2, 3, 4, 5, 10 respectively connected to each other. In other words, one or several of the same kits 20, 40, 50, 60 may be installed inside of the bolted joints 6, 7, 8, 9 for repositioning the two components 2, 3, 4, 5, 10 with respect to each other.

For installing of the kits 20, 40, 50, 60 inside of the bolted joint 9, some of the respective bores inside of the components 2, 3, 4, 5, 10 aligned with each other and connected with each other by bolts must first be cleared. After clearing the bores in the components, the kits 20, 40, 50, 60 may be consecutively installed inside of the bores of the components 2, 3, 4, 5, 10 forming the bolted joint 6, 7, 8, 9.

The alignment tool kit 20 comprises a block 21 having a first through hole 22 and two second through holes 23 in this exemplary case, although alternatively only one second through hole 23 may be provided. The first through hole 22 is located centrally of the two second through holes 23, which in turn are located adjacent to the first through hole 22 in the block 21.

Moreover, the block 21 optionally comprises a further hole 24 configured to receive a reaction stud 34 therein. The reaction stud 34 allows to operate a (hydraulic) wrench (not shown) to fasten an alignment bolt 25 to the block 21. The block 21 for this purpose may have an inner threaded section inside of the first through hole 22 corresponding to the outer threaded section 27 at an upper portion of the alignment bolt 25 near the head of the alignment bolt 25. Alternatively, as shown in FIG. 3, the alignment tool kit 20 may have a block-internal nut 28 fitting into the first through hole 22. The block-internal nut 28 may be inserted in a direction opposite to the direction in which the alignment bolt 25 is inserted through the first through hole 22.

The alignment tool kit 20 further comprises two fastening bolts 29 inserted through the second through holes 23, wherein washers 23 are located between the block 21 and the heads of the fastening bolts 29. The fastening bolts 29 are configured to pass through expandable bushes 31, having multiple slits 32 located at an end thereof and extending lengthwise along the expandable bushes 31.

Moreover, the alignment tool kit 20 has nuts 33 having a conical section 34 and a cylindrical section 35. The nuts 33 have an inner threaded section corresponding to an outer threaded section of the fastening bolts 29 such that the fastening bolts 29 may be fastened to the nuts 33. When the fastening bolts 29 are fastened to the nuts 33 while the expandable bushes 31 surround the fastening bolt 29, the bushes 31 expand to the outside or, in other words, in the radial direction. The cylindrical sections 35 limit the expandable bushes 31 from leaving their position but instead forces them to expand due to the conical shape of the conical sections 34 extending in circumference towards the cylindrical section 35.

The block 21 has a plate-like shape and may be made from a single material. For example, a metal, in particular steel, may be used for the block 21. The thickness of the block 21 at the location of the second through holes 23 is less than the thickness of the block 21 at the location of the first through hole 22. In particular, the portion of the block 21 having the second through holes 23 has a step or is graduated towards the portion of the block 21 having the central first through hole 22. For example, this facilitates operation of the wrench such that the worker is enabled to securely and tightly introduce the alignment bolt 25 into the bores.

The guiding tool kit 40 has a guiding stud 41 having an unthreaded section 42 in the middle thereof. The unthreaded section 42 has an outer diameter that is substantially equal to an inner diameter of the bores of the components 2, 3, 4, 5, 10 through which it is inserted. The guiding stud 41 further has two threaded end-sections 43, 44, wherein one of them is configured for being fastened inside of the bores and the other one of them is, together with a connection portion 45 for connecting to a nut 46, configured for being connected to the nut 46 for later extraction of the guiding stud 41 from the bores in the components 2, 3, 4, 5, 10.

Figure 8:
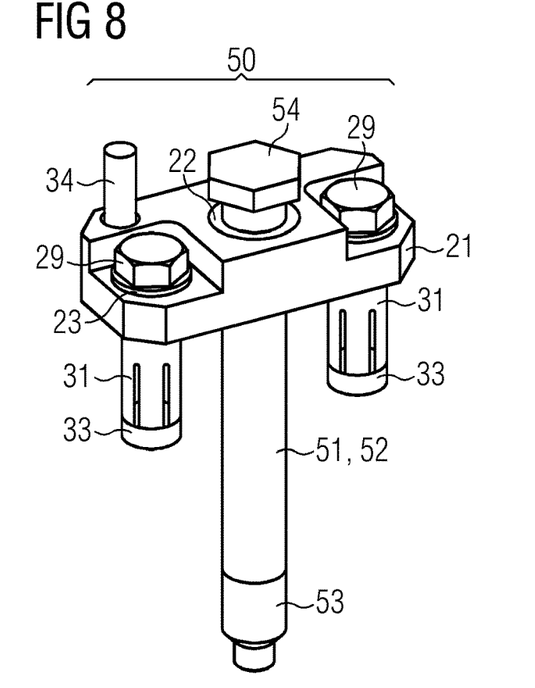
FIG. 8 shows a perspective view on a compression tool kit of the system of FIG. 3.

FIG. 8 shows that the compression tool kit 50 essentially has the same design, having block 21, fastening bolts 29, expandable bushings 31 and nuts 33, as the alignment tool kit 20 except for having a compression stud 51 and a compression actuator 54 instead of the alignment bolt 25 in the alignment tool kit 20.

The compression stud 51 has a threaded end-section 53 and is configured at its end opposite to the threaded end-section 53 for being connected to a pushing bolt 54. A spacer or adapter 55 may be provided for extending the length of the compression stud 51 between the compression stud 51 and the pushing bolt 54.

The pulling tool kit 60 comprises a pulling stud 61 having two outer threaded end-sections 62, 64. The pulling stud 61 has an unthreaded middle section 63 in between the two threaded end-sections 62, 64. Further, the pulling tool kit 60 comprises a nut 65 and a washer 66.

In the following, the purpose and operation of the kits 20, 40, 50, 60 will be explained with reference to FIGS. 4-12 in more and exemplary detail. In particular, the bolted joint 9 of the wind turbine 1 will be highlighted as an exemplary bolted joint 9, in which the system 100 may be installed as explained in the following. However, any of the previously described bolted joints 6, 7, 8 of FIG. 1 may as well be provided with the system 100.

Figure 4:
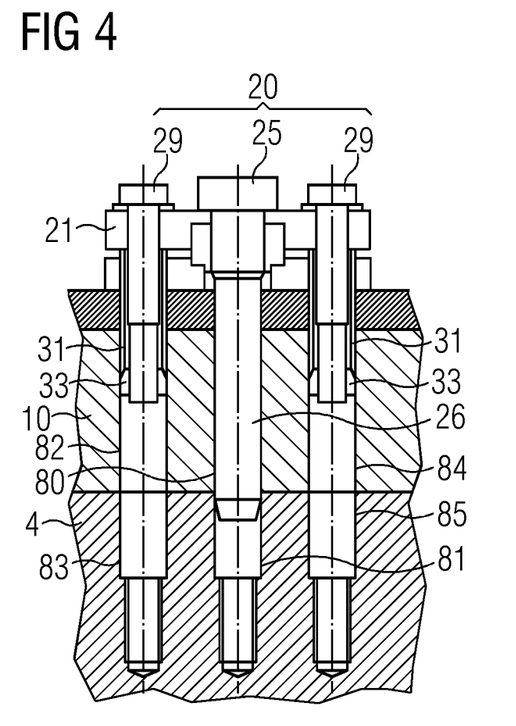
FIG. 4 shows a cross-sectional view on an alignment tool kit of the system of FIG. 3 installed between the two components of FIG. 2.

FIG. 4 shows the alignment tool kit 20 installed inside of the bolted joint 9 between the rotor 4 as one component and the main shaft 10 as another component of the wind turbine 1.

The block 21 is positioned on top of the main shaft 10 as component and the fastening bolts 29 and alignment bolt 25 enter from the side of the main shaft 10 into the bolted joint 9 of the components 4, 10. However, alternatively, it may be the other way around.

The alignment bolt 25 is fastened to the block 21 via the block-internal nut 28, and the alignment bolt 25 is introduced into aligned first bores 80, 81 inside of the components 4, 10. Prior to introducing the alignment bolt 25 together with the fastening bolts 29 inside of the bores 80, 81, 82, 84, bolts (not shown) originally located in the bores 80, 81, 82, 83, 84, 85 to form the bolted joint 9 have been removed.

The alignment bolt 25 comprises an unthreaded section 26 having an outer diameter being substantially equal to an inner diameter of the first bores 80, 81 such that the alignment bolt 25 by usage of the wrench is achieved as a press-fit inside of the aligned first bores 80, 81, thereby aligning and repositioning the two components 4, 10 with respect to each other, when they have been mispositioned priorly due to excessive loads, for example.

The fastening bolts 29 inserted into the second bores 82, 84 inside of component 10 being (in particular directly, i.e., without any other bores in between) adjacent to the first bores 80, 81 assist the alignment bolt 25 in withstanding the loads from the performed alignment operation. For this purpose, the fastening bolts 29 are fastened to the nuts 33 inside of the bores 82, 83 and inside of the expandable bushes 31 such that the expandable bushes 31 expand sliding over the conical sections 34 of the nuts 33 and firmly attach to the inside of the bores 82, 84.

Figure 5:
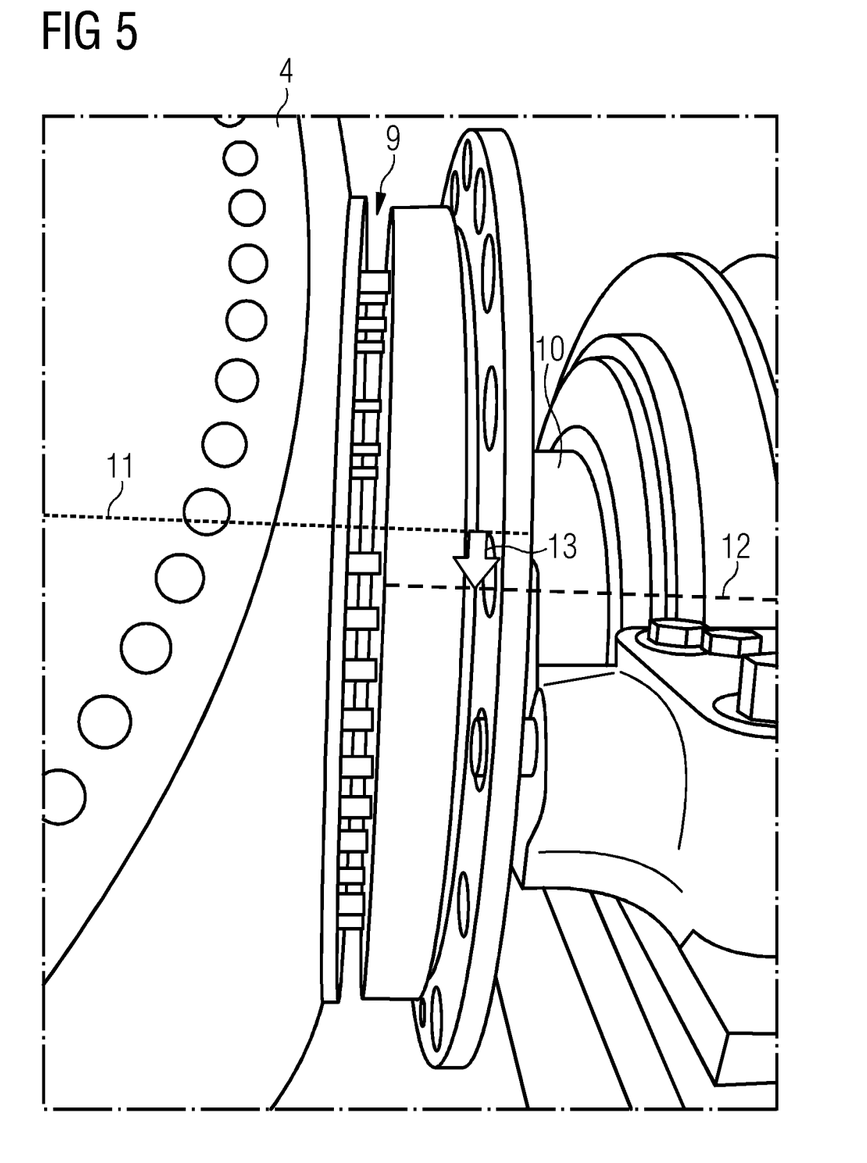
FIG. 5 shows the view of FIG. 2 with indication of the alignment operation provided by the alignment tool kit of FIG. 4.

FIG. 5 shows the alignment operation performed by the alignment tool kit 20 indicated by an arrow 13 between the axis 11 of component 4, which in this case is the rotor 4, and the axis of component 10, which in this case is the main shaft 10.

Figure 6:
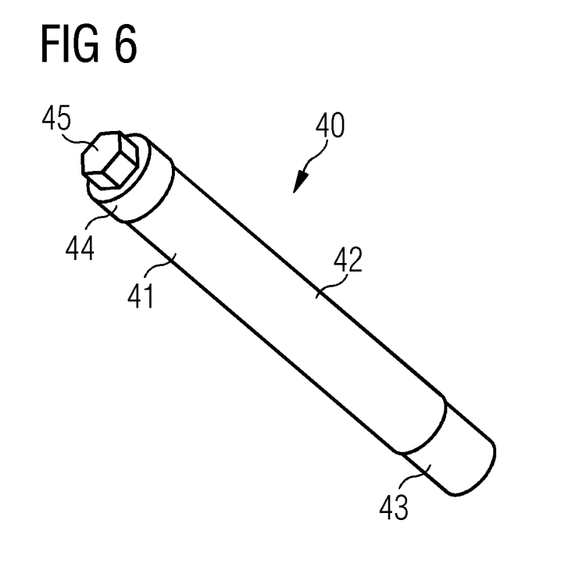
FIG. 6 shows a perspective view on a guiding stud of the system of FIG. 3.

FIG. 6 shows the guiding stud 41 of the guiding tool kit 40 with its threaded sections 43, 44 and unthreaded section 41. The guiding stud 41 may be introduced into third bores (not shown) being different from the first and second bores after introducing one or multiple alignment tool kits 20 in the bolted joint 9.

Figure 7:
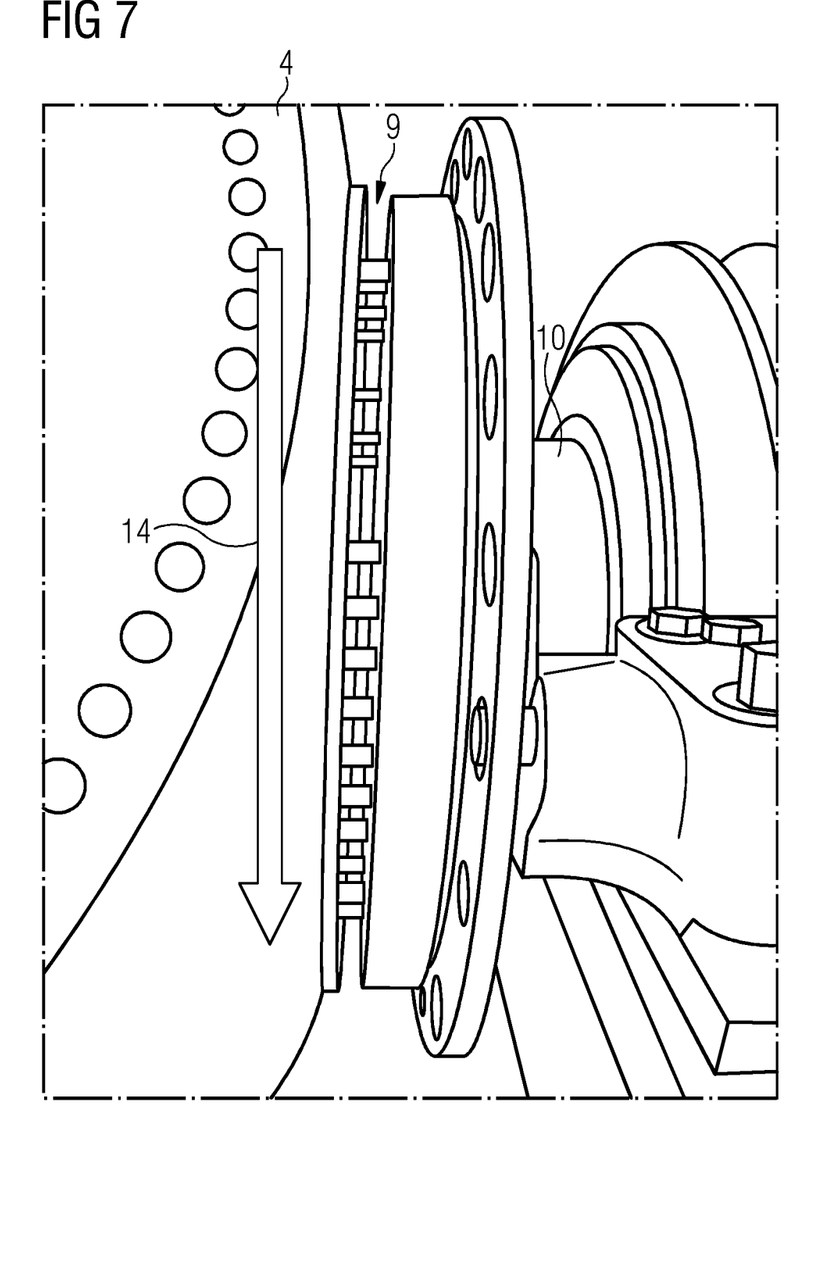
FIG. 7 shows the view of FIG. 2 with indication of the shear loads acting on the bolted joint.

FIG. 7 indicates by means of arrow 14 the direction in which the shear loads act on the bolted joint 9. When the guiding stud 41 is inserted into the bores of the components 4, 10, the substantially equal outer diameter of the unthreaded section 42 and the inner diameter of the bores of the components 4, 10 allow the guiding stud 41 to withstand that shear load. Multiple of such guiding studs 41 may, after inserting one or multiple of the alignment tool kits 20 into other bores of the components 4, 10, be inserted into the bores of the bolted joint 9, in which prior to that, bolts have been forming the bolted joint 9.

Figure 9:
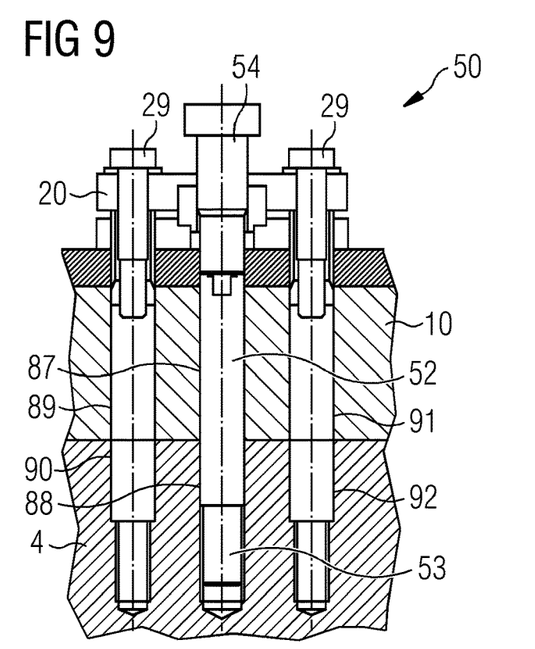
FIG. 9 shows a cross-sectional view on the compression tool kit of the system of FIG. 3 installed between the two components of FIG. 2.

FIG. 9 shows how the compression tool kit 50 is inserted into the bolted joint 9 formed between the components 4, 10. The compression tool kit 50 may be introduced into the bolted joint 9, more specifically into bores 87, 88, 89, 90, 91, 92 cleared from previously inserted bolts of the bolted joint 9 therein, after the at least one alignment tool kit 20 and the at least one guiding stud 41 have been introduced to the bolted joint 9.

The fastening bolts 29 in the fifth bores 89, 91 together with the expandable bushes 31 and the nuts 33 have the same function as previously described for the alignment tool kit 20. The compression stud 51 in the fourth bores 87, 88 and the compression actuator 54, in this example in the form of a pushing bolt 54, have the purpose to create a compression load from component 4 to component 10. For this purpose, the compression stud 51 is introduced into the bores 87, 88 and fastened with its threaded end-section 53 inside of the bore 88. Further fastening by means of the compression actuator 54 or application of torque via the compression actuator 54 results in creating a compression load, which creates a movement that separates the component 4 from component 10. To extend the separation between the components 4, 10, the spacer 55 may be used as seen in FIG. 3.

Figure 10:
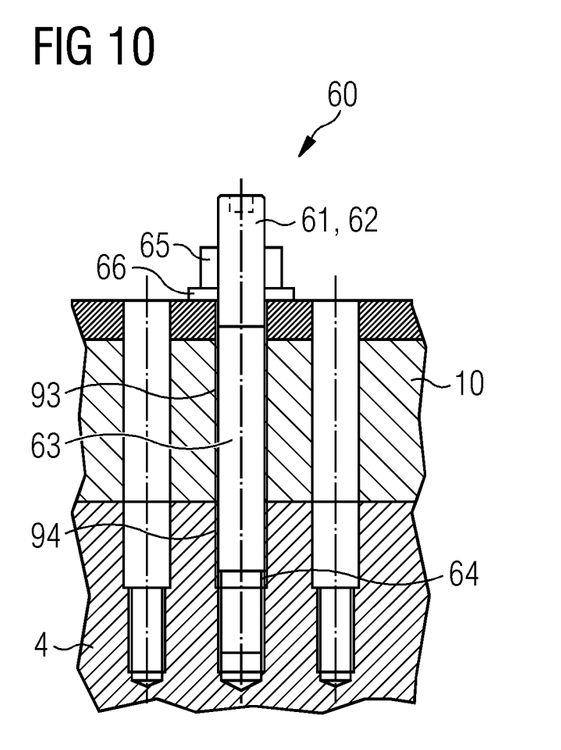
FIG. 10 shows a cross-sectional view on a pulling tool kit of the system of FIG. 3 installed between the two components of FIG. 2.

FIG. 10 shows the pulling tool kit 60 in use between the components 4, 10. The pulling stud 61 is inserted into the aligned sixth bores 93, 94 of the components 4, 10. With its threaded end section 64, the pulling stud 61 is fastened to the bore 94 inside of component 4. The nut 65 is fastened to the other threaded end-section 62 of the pulling stud 61, and the washer 66 is located between nut 66 and a surface of the component 10. Now, by actuating the nut 65, the pulling stud creates a traction load from component 10 to component 4.

Figure 11:
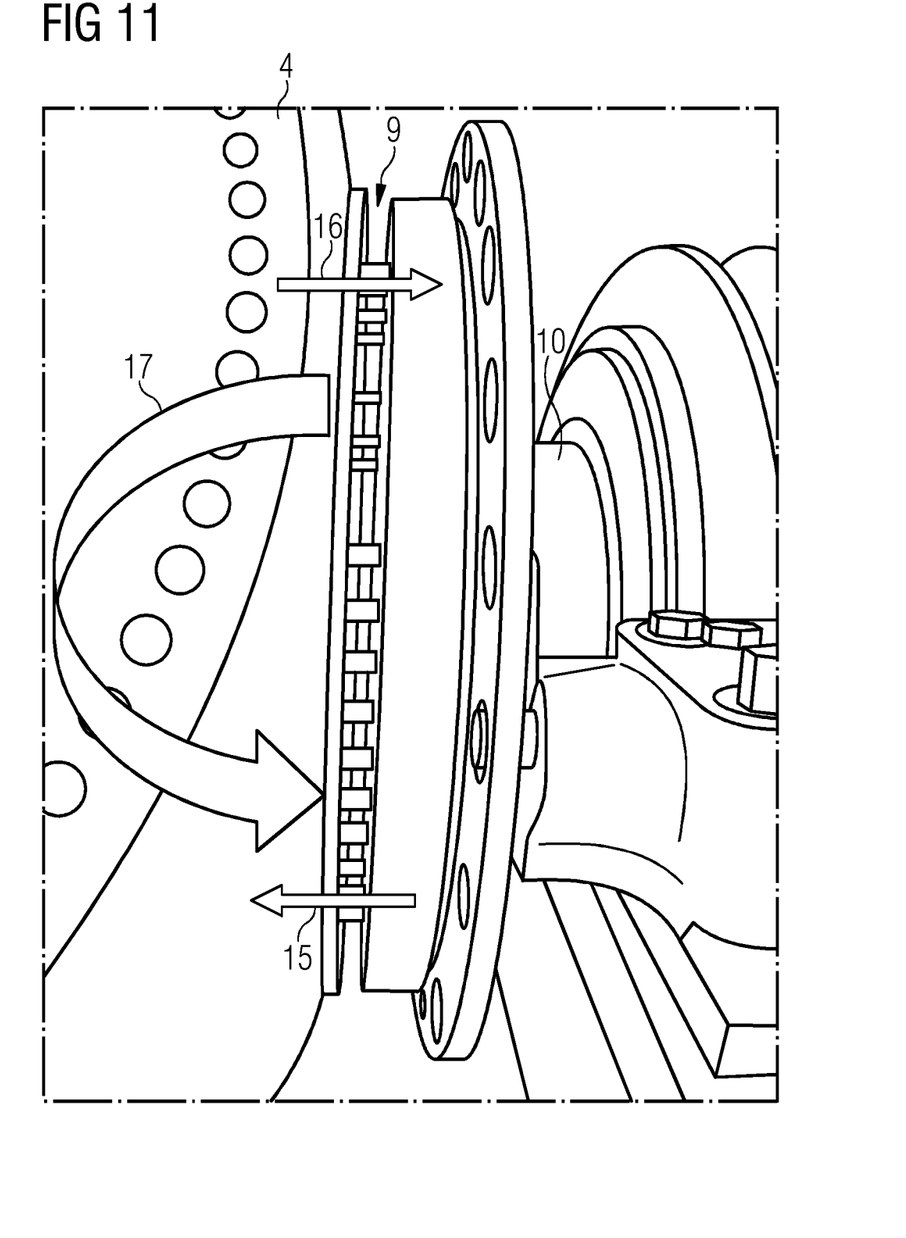
FIG. 11 shows the view of FIG. 2 with indication of pull and push operations to be achieved by means of the system of FIG. 3.

Accordingly, by means of the pulling tool kit 60, it is possible to pull the component 4 towards component 10 in a pulling operation indicated in FIG. 11 with arrow 16. With the compression tool kit 50, on the other hand, it is possible to push the component 4 away from the component 10 as indicated by arrow 15.

As shown in FIG. 11, in the case of the component 4 being a rotor 4 and the component 10 being a main shaft 10 as shown in FIG. 11, the pulling and pushing is typically required due to high bending loads 17 being applied to the bolted joint 9 due to the gravity acting on the rotor 4 and blades 5, pulling them downwards with respect to the main shaft 10 being supported via the nacelle 3 on the tower 2.

To establish the original design position of the bolted joint 9 after the bending loads 17 have been applied to the bolted joint 9 during the previous lifetime of the wind turbine 1, the system 100 as shown in FIG. 3 may be used with all or some of the kits 20, 40, 50, 60. In particular, alignment tool kits 20 may first be used to achieve the proper alignment as shown in FIG. 5. Afterwards, the guiding studs 41 may be introduced to be able to withstand the shear loads. Then, depending on the particular position of the components 4, 10 with respect to each other, either or both of the compression tool kits 50 and the pulling tool kits 60, in particular at different locations of the bolted joints 9, e.g., as shown in FIG. 11, on opposite sides of the bolted joints 9, may be applied to the bolted joint 9.

Figure 12:
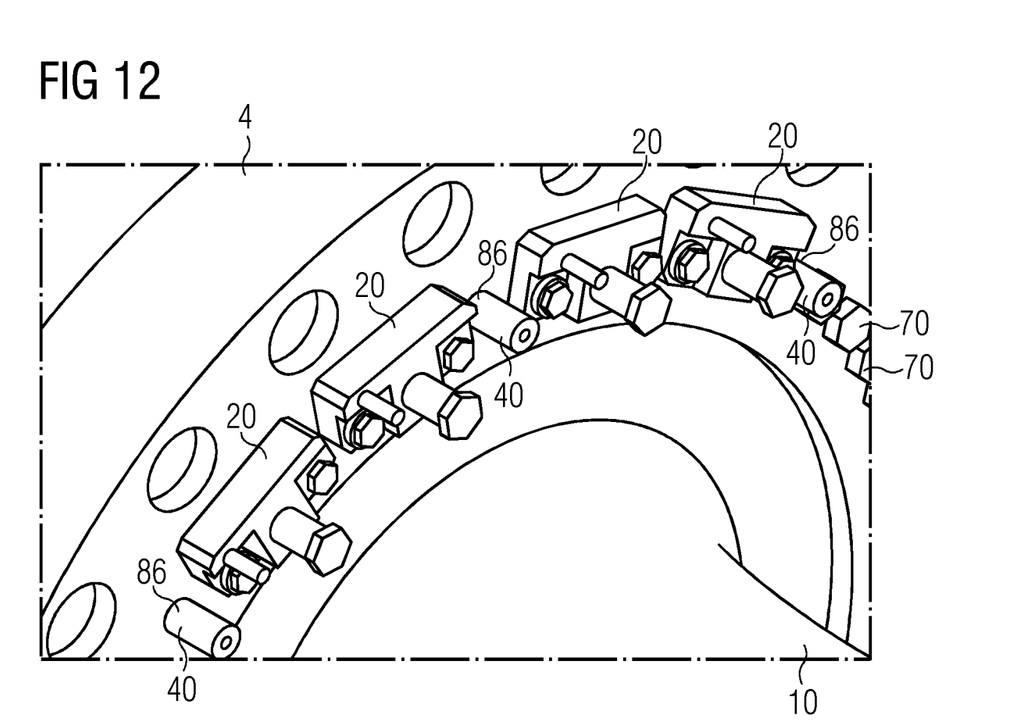
FIG. 12 shows a further perspective view of the bolted joint of FIG. 2 having installed therein alignment tool kits according to FIG. 3 and guiding studs according to FIG. 6.

FIG. 12 shows a portion of a bolted joint 9 in which multiple alignment tool kits 20 and guiding studs 41 of guiding tool kits 40 have been introduced into the bolted joint 9 after removing bolts 70 originally present in the bolted joint 9.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for repositioning two components of a wind turbine with respect to each other, the two components being connected to each other by a bolted joint and the system having at least one alignment tool kit in combination with or alternatively at least one compression tool kit, wherein the at least one alignment tool kit comprises:
    a block having at least two through holes;
    an alignment bolt configured for passing through a first through hole of the at least two through holes of the block and through two aligned first bores of the two components;
    at least one fastening bolt configured for passing through a second through hole of the at least two through holes of the block and a second bore of one of the two components, the second bore being adjacent to one of the first bores;
    at least one expandable bush configured for surrounding the at least one fastening bolt and configured to be inserted together with the at least one fastening bolt into the second bore; and
    at least one nut configured for at least partial insertion into the expandable bush and having an inner threading corresponding to an outer threading of the at least one fastening bolt such that the at least one fastening bolt may be fastened to the at least one nut inside of the expandable bush and the second bore,
wherein the at least one compression tool kit comprises:
    a compression stud configured for passing through two aligned fourth bores of the two components, the compression stud having a threaded end-section corresponding to an inner threading of one of the two fourth bores;
    a compression actuator configured for being attached to the compression stud and creating a compression load between the two components when being actuated, a block comprising at least two through holes, wherein the compression stud is configured for passing through a first through hole of the at least two through holes in the block;

at least one fastening bolt configured for passing through a second through hole of the at least two through holes in the block and a fifth bore of one of the two components, the fifth bore being adjacent to one of the fourth bores;

at least one expandable bush configured for surrounding the at least one fastening bolt and to be inserted together with the at least one fastening bolt into the fifth bore; and at least one nut configured for insertion into the expandable bush and having an inner threading corresponding to an outer threading of the at least one fastening bolt such that the at least one fastening bolt may be fastened to the at least one nut inside of the expandable bush and the fifth bore.

2. The system according to claim 1, wherein the at least one alignment tool kit comprises at least two fastening bolts, each one being configured for passing through one of two second through holes of at least three through holes in the block and one of two second bores of one of the two components, the first bores being disposed between the two second bores, and wherein the at least one alignment tool kit further comprises expandable bushes and nuts for each one of the at least two fastening bolts.

3. The system according to claim 1, wherein the alignment bolt comprises an unthreaded section having an outer diameter being substantially equal to an inner diameter of the two first bores.

4. The system according to claim 1, wherein the at least one alignment tool kit and the alignment bolt comprise respectively corresponding means for fastening the alignment bolt to the block.

5. The system according to claim 1, wherein the at least one expandable bush comprises at least one slit.

6. The system according to claim 1, wherein the at least one nut comprises a conical section.

7. The system according to claim 1, wherein the system further comprises at least one guiding stud configured for passing through two aligned third bores of the two components.

8. The system according to claim 7, wherein the at least one guiding stud comprises an unthreaded section having an outer diameter being substantially equal to an inner diameter of the two third bores.

9. The system according to claim 7, wherein the at least one guiding stud comprises a threaded end section corresponding to an inner threading of the two aligned third bores.

10. The system according to claim 1, wherein the system further comprises at least one pulling tool kit, the at least one pulling tool kit comprising a pulling stud having an outer threaded end section corresponding to inner threads of two aligned sixth bores of the two components and the at least one pulling stud having an unthreaded section having an outer diameter being substantially equal to an inner diameter of the two aligned sixth bores.

11. The system according to claim 10, wherein the at least one pulling tool kit further comprises a pulling actuator configured for being attached to the at least one pulling stud and pulling the two components towards one another when being actuated.

12. A wind turbine comprising two components being connected to each other by a bolted joint and the system according to claim 1.

13. The wind turbine according to claim 12, wherein at least a first component and/or a second component of the two components is/are any of a hub, a rotor, a blade section, a tower section, a shaft, or a nacelle section of the wind turbine.

14. The wind turbine according to claim 13, wherein at least a first component and/or a second component of the two components has/have a substantially circular or oval section, in particular wherein the bolts that form the bolted joint are distributed and connect the two components with each other through bores provided therein.

15. A method for aligning and repositioning components of a wind turbine comprising the steps:

providing the system according to claim 1;

passing through the first through hole of the at least two through holes of the block and through the two aligned first bores of the two components;

inserting the alignment bolt into the two aligned first bores;

mechanically connecting the at least one fastening bolt together with the at least one expandable bush and the at least one nut inside of the second bore to the alignment bolt by means of the block, and thereby supporting the alignment bolt in withstanding the loads acting on the alignment bolt in the course of the alignment operation; and fastening the fastening bolt to the nut inside of the expandable bush and thereby expanding the expandable bush inside of the second bore and thereby firmly pressing against the inside or inner wall or threading of the second bore.

\* \* \* \* \*